United States Patent
Glugla

(10) Patent No.: US 10,202,898 B2
(45) Date of Patent: Feb. 12, 2019

(54) METHOD AND SYSTEM FOR FUEL INJECTION CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/497,001

(22) Filed: Apr. 25, 2017

(65) Prior Publication Data

US 2018/0306106 A1 Oct. 25, 2018

(51) Int. Cl.
*F02B 75/04* (2006.01)
*F02D 41/30* (2006.01)

(52) U.S. Cl.
CPC .......... *F02B 75/044* (2013.01); *F02B 75/045* (2013.01); *F02B 75/048* (2013.01); *F02D 41/3005* (2013.01)

(58) Field of Classification Search
CPC ...... F02D 15/02; F02D 15/00; F02D 2700/03; F02D 35/027; F02D 37/02; F02D 41/40
See application file for complete search history.

(56) References Cited

U.S. PATENT DOCUMENTS

| | | | |
|---|---|---|---|
| 6,318,308 B1 | 11/2001 | Hsu et al. | |
| 6,564,769 B2 | 5/2003 | Kolmanovsky et al. | |
| 6,938,593 B2 * | 9/2005 | Magner | F01L 1/022 123/90.15 |
| 6,990,934 B2 | 1/2006 | Sugiyama et al. | |
| 7,840,335 B2 | 11/2010 | Akihisa et al. | |
| 8,087,390 B2 | 1/2012 | Hiyoshi et al. | |
| 8,627,789 B2 * | 1/2014 | Hiraya | F02D 15/02 123/179.16 |
| 9,291,108 B2 | 3/2016 | Kurashima | |
| 9,429,095 B2 | 8/2016 | Zukouski | |
| 2011/0005496 A1 * | 1/2011 | Hiraya | F02D 15/02 123/48 B |
| 2014/0090615 A1 * | 4/2014 | Mistry | F02B 33/22 123/90.17 |
| 2016/0003169 A1 * | 1/2016 | Leone | F02D 41/0087 123/481 |

OTHER PUBLICATIONS

"Waulis Motors Ltd The new engine Revolution," Waulis Motors Ltd, Available Online at http://waulis.com/, Retrieved on Jun. 22, 2017, Available as Early as Jan. 8, 2012, 2 pages.

* cited by examiner

*Primary Examiner* — Long T Tran
(74) *Attorney, Agent, or Firm* — Julia Voutyras; McCoy Russell LLP

(57) ABSTRACT

Methods and systems are provided for adjusting a fuel direct injection split ratio and injection timing in a variable compression ratio engine. In one example, as the compression ratio increases, the split ratio of fuel injected during an intake stroke relative to a compression stroke is increased, with a start of the intake stroke injection retarded and a start of the compression stroke injection advanced. Additionally, the fuel direct injection split ratio and injection timing may be further adjusted responsive to an indication of preignition or knock.

20 Claims, 6 Drawing Sheets

METHOD AND SYSTEM FOR FUEL INJECTION CONTROL

FIELD

The present description relates generally to methods and systems for controlling fuel injection in a variable compression ratio engine.

BACKGROUND/SUMMARY

A compression ratio of an internal combustion engine is defined as a ratio of a cylinder volume when a piston within the cylinder is at bottom-dead-center (BDC) to the cylinder volume when the piston is at top-dead-center (TDC). In general, the higher the compression ratio, the higher the thermal efficiency of the internal combustion engine. This in turn results in improved fuel economy and a higher ratio of output energy versus input energy of the engine. In conventional engines, the compression ratio is fixed, and thus, the engine efficiency cannot be optimized during different operating conditions in order to improve fuel economy and engine power performance. However, in variable compression ratio (VCR) engines, the engine may be equipped with various mechanisms to mechanically alter the volumetric ratio between the piston TDC and BDC, allowing the compression ratio to be varied as engine operating conditions change. As a non-limiting example, the VCR engine may be configured with a mechanical piston displacement changing mechanism (e.g., an eccentric) that moves the piston closer to or further from the cylinder head, thereby changing the size of the combustion chambers. Still other engines may mechanically alter a cylinder head volume.

VCR engines may be fueled, at least in part, through direct injection (hereafter also referred to as "DI"), wherein fuel is injected directly into the engine cylinders. The timing of the direct injection may be selected as a function of crankshaft position and may be scheduled for a duration. Further, direct injections may be scheduled during an intake stroke, a compression stroke, or a combination of both, called split injection. In conventional engines, a crankshaft position corresponds to a specific position of the piston relative to the cylinder head. However in a VCR engine, since the position of the piston relative to the cylinder head may change based on the compression ratio, the actual injection timing may be different than intended if selected based on the crankshaft position. For example, during the intake stroke while the piston is moving down, the piston will be higher in the cylinder bore at a higher compression ratio relative to a lower compression ratio, and thus, direct injection at the same crankshaft position would result in different actual injection timings for the two compression ratios. If the piston is close to the fuel injector when fuel injection occurs, more fuel may adhere to the piston, resulting in increased particulate matter emissions.

One example approach for adjusting fuel direct injection based on compression ratio in a VCR engine is shown by Kurashima et al. in U.S. Pat. No. 9,291,108. Therein, fuel is injected as either an intake stroke direct injection or a compression stroke direct injection. As a compression ratio increases, intake stroke injection timing is retarded when intake stroke injection is applied. Else, if compression stroke injection is applied, compression stroke injection timing is advanced as the compression ratio increases. In addition, the compression stroke injection is split into a greater number of split injections as the compression ratio increases. As a result, the injection period for each injection is shortened, reducing the penetration of the fuel spray, and thereby the emissions.

However, the inventors herein have recognized that still further improvements in combustion performance can be achieved by leveraging the different evaporation properties of an injected fuel when operating the engine at different compression ratios. For example, fuel may evaporate more easily in the compression stroke, requiring less fuel mass to be delivered. In addition, combustion stability is improved at higher compression ratios. The different fuel evaporation properties can be further leveraged with the different charge cooling effects realized from injecting fuel in the intake stroke relative to the compression stroke to reduce the propensity for abnormal combustion events, as can occur due to extended engine operation in a higher compression ratio. Further still, at higher compression ratios, less compression stroke injection may be used because a smaller cylinder volume at TDC relative to a lower compression ratio creates a rich enough air-fuel ratio in the vicinity of a spark plug to facilitate combustion.

In one example, performance of a VCR engine may be improved by a method for an engine, comprising: actuating a variable compression ratio mechanism of a cylinder to provide a compression ratio selected based on engine operating conditions; and adjusting an amount of fuel direct injected into the cylinder in an intake stroke relative to a compression stroke based on the selected compression ratio. In this way, fuel may be delivered as a split injection over an intake stroke and a compression stroke, with the split ratio adjusted for a given compression ratio, thereby improving fuel evaporation and combustion stability.

As one example, a compression ratio of engine operation as well as a total fuel mass to be delivered may be selected based on engine operating conditions, including engine speed-load and operator torque demand. Based on the selected compression ratio, a variable compression ratio mechanism may be actuated to vary a piston clearance volume. In addition, the total fuel mass may be delivered as a split direct injection with a first portion of the total fuel mass delivered in the intake stroke and a second, remaining portion of the total fuel mass delivered in the compression stroke. As the compression ratio increases, the split ratio of the first intake stroke portion to the second compression stroke portion may be varied so that a larger portion of the total fuel mass is delivered in the intake stroke. Herein, the fuel mass delivered in the compression stroke may be decreased to take advantage of the improved evaporation of fuel injected in the compression stroke at higher compression ratios. At the same time, by delivering a larger fuel mass in the intake stroke when operating at the higher compression ratio, the increased charge cooling effect of the intake stroke injection can be leveraged to reduce the propensity for abnormal combustion events, such as knock and pre-ignition, when operating at the higher compression ratio. Further, multiple short duration intake stroke injections may be used to decrease fuel penetration, especially when tumble is highest, thereby avoiding fuel impingement on cylinder walls and the top of the piston and, in turn, reducing soot formation. The split ratio may be further adjusted based on an alcohol content or octane rating of the injected fuel, such as by further reducing the portion of fuel delivered in the compression stroke as the alcohol content of the fuel increases. In addition to adjusting the fuel split ratio, a timing of the injections may also be adjusted, such as by retarding the start of timing of the intake stroke injection while advancing the start of timing of the compression stroke injection as the compression ratio increases. Further, each of the intake stroke and compression stroke injection may be split into multiple injections.

In this way, a fuel injection profile, including fuel split ratio, injection timing, and injection number, may be adjusted based on a selected compression ratio to improve engine performance. The technical effect of reducing fuel mass injected in a compression stroke while correspondingly increasing fuel mass injected in an intake stroke as the compression ratio increases is that the increased evaporation of fuel in a compression stroke at higher compression ratios may be leveraged to improve combustion stability. Concurrently, the higher charge cooling effect of the intake stroke fuel injection may be leveraged to reduce knock and pre-ignition incidence. By reducing the propensity for abnormal combustion, fuel economy is improved due to reduced need for spark retard or cylinder enrichment, and engine component life is extended. Further, the engine may be operated with a more fuel efficient compression ratio for a longer duration of time. By adjusting the injection timing based on the compression ratio, while taking into account the nature of the VCR mechanism providing the selected compression ratio, fuel may be injected at an optimum piston height within a cylinder, reducing fuel adherence to the piston and, in turn, particulate matter emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
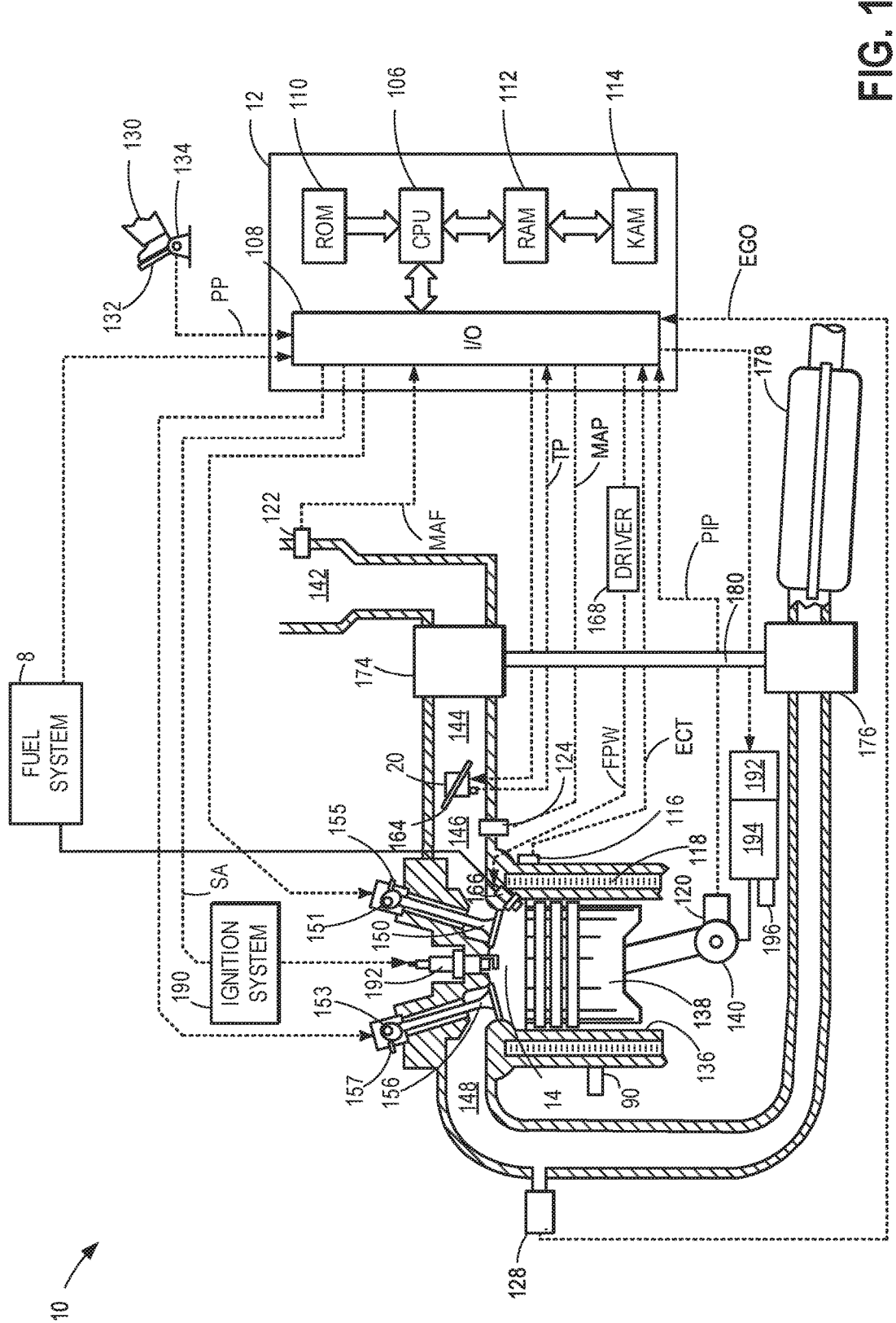
FIG. 1 illustrates an example engine system configured with a variable compression ratio mechanism.

The following description relates to systems and methods for adjusting a fuel direct injection split ratio and injection timing in an engine system equipped with a variable compression ratio (VCR) mechanism, such as the example engine system of FIG. 1. By actuating the VCR mechanism, a position of a piston within a cylinder of the engine, and therefore a compression ratio of the engine, can be varied, allowing for improvements in thermal efficiency. A controller may be configured to perform a control routine, such as the example routine of FIG. 2, to vary the fuel split ratio and injection timing based on the compression ratio of the engine, such as illustrated in the example graphs of FIGS. 4 and 5, respectively. In response to an indication of abnormal combustion, such as knock or pre-ignition, the controller may perform mitigating actions to prevent further abnormal combustion, for example, according to the method of FIG. 3. An example engine operation with compression ratio, fuel split ratio, and fuel injection timing adjustments is shown at FIG. 6. In this way, injection timings and amounts may be optimized for a given compression ratio, thereby increasing combustion stability and maximizing engine efficiency over a range of engine operating conditions.

FIG. 1 depicts an example embodiment of a combustion chamber (herein, also referred to as "cylinder") 14 of an internal combustion engine 10, which may be included in a passenger vehicle. Engine 10 may receive control parameters from a control system, including a controller 12, and input from a vehicle operator 130 via an input device 132. In this example, input device 132 includes an accelerator pedal and a pedal position sensor 134 for generating a proportional pedal position signal PP. Cylinder 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Engine 10 may be configured as a VCR engine wherein the compression ratio (CR) of each cylinder—a ratio of a cylinder volume when the piston is at bottom-dead-center (BDC) to a cylinder volume when the piston is at top-dead-center (TDC)—can be mechanically altered. The CR of the engine may be varied via a VCR actuator 192 actuating a VCR mechanism 194. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example embodiments, there may be predefined number of stepped compression ratios between the first, lower CR and the second, higher CR. Further still, the CR may be continuously variable between the first, lower CR and the second, higher CR (to any CR in between).

In the depicted example, VCR mechanism 194 is coupled to piston 138 such that the VCR mechanism may change the piston TDC position. For example, piston 138 may be coupled to crankshaft 140 via VCR mechanism 194, which may be a piston position changing mechanism that moves the piston closer to or further from the cylinder head, thus changing the position of the piston and thereby the size of combustion chamber 14. A position sensor 196 may be coupled to the VCR mechanism 194 and may be configured to provide feedback to controller 12 regarding the position of VCR mechanism 194 (and thereby the CR) of the cylinder.

In one example, changing the position of the piston within the combustion chamber also changes the relative displacement of the piston within the cylinder. The piston position changing VCR mechanism may be coupled to a conventional cranktrain or an unconventional cranktrain. Non-limiting examples of an unconventional cranktrain to which the VCR mechanism may be coupled include variable distance head crankshafts and variable kinematic length crankshafts. In one example, crankshaft 140 may be configured as an eccentric shaft. In another example, an eccentric may be coupled to, or in the area of, a piston pin, with the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In another example, the VCR mechanism may include a hydraulic pressure-reactive, air pressure-reactive, or mechanically reactive piston. Further still, the VCR mechanism may include a multi-link mechanism, a bent rod mechanism, or other VCR mechanizations.

It will be appreciated that as used herein, the VCR engine may be configured to adjust the CR of the engine via mechanical adjustments that vary a piston position or a cylinder head volume. As such, VCR mechanisms do not include CR adjustments achieved via adjustments to a valve or cam timing.

By adjusting the position of the piston within the cylinder, an effective (static) compression ratio of the engine (e.g., a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to VCR actuator 192 to actuate the VCR mechanism 194 to a first position where the piston has a smaller effective displacement within the combustion chamber. As another example, the engine may be operated at a second, higher compression ratio by the controller sending a signal to VCR actuator 192 to actuate the VCR mechanism 194 to a second position where the piston has a larger effective displacement within the combustion chamber. Changes in the engine compression ratio may be advantageously used to improve fuel economy. For example, a higher compression ratio may be used to improve fuel economy at light to moderate engine loads until spark retard from early knock onset erodes the fuel economy benefit. The engine can then be switched to a lower compression ratio, thereby trading off thermal efficiency for combustion phasing efficiency. Continuous VCR systems may continuously optimize the combustion phasing and the thermal efficiency to provide the best compression ratio between the higher compression ratio and lower compression ratio limits at the given operating conditions.

Returning to FIG. 1, cylinder 14 may receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. As shown, compressor 174 may be at least partially powered by exhaust turbine 176 via a shaft 180. However, in other examples, such as where engine 10 is configured with a supercharger, exhaust turbine 176 may be optionally omitted, and compressor 174 may instead be powered by mechanical input from a motor of the engine.

A throttle 20, including a throttle plate 164, may be provided between intake air passage 144 and intake air passage 146 for varying the flow rate and/or pressure of intake air provided to the engine cylinders. For example, throttle 20 may be disposed downstream of compressor 174, as shown in FIG. 1, or may alternatively be provided upstream of compressor 174.

Exhaust passage 148 may receive exhaust gases from other cylinders of engine 10 in addition to cylinder 14. An exhaust gas sensor 128 is shown coupled to exhaust passage 148 upstream of an emission control device 178. Exhaust gas sensor 128 may be any suitable sensor for providing an indication of exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as engine speed, engine load, AFR, spark timing, etc. Further, exhaust temperature may be determined from one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including one intake poppet valve 150 and one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via a cam actuation system 151. Similarly, exhaust valve 156 may be controlled by controller 12 via a cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation, including CPS and/or VCT systems. In still other embodiments, the intake and exhaust valves may be controlled by a common valve actuator or actuation system or a variable valve timing actuator or actuation system.

Cylinder 14 may have an associated compression ratio, which, as described above, is the ratio of volumes when piston 138 is at BDC to TDC. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be varied based on driver demand via adjustments to the VCR actuator 192 that actuates the VCR mechanism 194, varying the effective position of piston 138 within combustion chamber 14. The compression ratio may be inferred based on feedback from sensor 196 regarding the position of the VCR mechanism 194.

In some embodiments, each cylinder of engine 10 may include a spark plug 192 for initiating combustion. An ignition system 190 may provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection ("DI") of fuel into combustion cylinder 14. While FIG. 1 shows injector 166 as a side injector, injector 166 may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8, which may include one or more fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the one or more fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof in what is known as split injection. For example, as compression ratio increases, a split ratio of intake stroke injection to compression stroke injection may increase, as described further with respect to FIGS. 2 and 4. Also, fuel may be injected during the cycle to adjust the air-fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of oxygen in the exhaust gas, which is higher for lean mixtures and lower for rich mixtures, the sensor may determine the AFR. As such, the AFR may be provided as a lambda ($\lambda$) value, which is a ratio of the determined AFR to a stoichiometry AFR for a given mixture. Thus, a $\lambda$ value of 1.0 indicates a stoichiometric mixture (e.g., the AFR for a complete combustion reaction to occur), while a $\lambda$ value less than 1.0 indicates richer than stoichiometry mixtures and a $\lambda$ value greater than 1.0 indicates leaner than stoichiometry mixtures.

As described above, FIG. 1 shows only one cylinder of a multi-cylinder engine. As such each cylinder may similarly include its own set of intake/exhaust valves, fuel injector(s), spark plug(s), etc.

Fuel tanks in fuel system 8 may hold fuel with different fuel qualities, such as different fuel compositions. These differences may include different alcohol content, different octane, different heats of vaporization, different fuel blends, and/or combinations thereof, etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. Further, once identified and differentiated, the abnormal combustion event may be accordingly addressed. For example, knock may be addressed by adjusting a fuel split ration and injection timing and/or retarding spark timing, while pre-ignition may be addressed by enriching the AFR of the combustion and/or reducing the compression ratio, as described further with respect to FIG. 3.

Returning to FIG. 1, controller 12 is shown as a microcomputer, including a microprocessor unit 106, input/output ports 108, an electronic storage medium for executable programs and calibration values shown as read-only memory chip 110 in this particular example, a random access memory 112, a keep alive memory 114, and a data bus. Controller 12 may receive various signals from sensors coupled to engine 10, including, in addition to those signals previously discussed, a measurement of inducted mass air flow (MAF) from a mass air flow sensor 122, engine coolant temperature (ECT) from a temperature sensor 116 coupled to a cooling sleeve 118, a profile ignition pickup signal (PIP) from a Hall effect sensor 120 (or other type) coupled to crankshaft 140, throttle position (TP) from a throttle position sensor, an absolute manifold pressure signal (MAP) from a MAP sensor 124, cylinder AFR from EGO sensor 128, abnormal combustion from knock sensor 90 and a crankshaft acceleration sensor, and VCR mechanism position from position sensor 196. Engine speed signal, RPM, may be generated by controller 12 from signal PIP. The signal MAP from MAP sensor 124 may be used to provide an indication of vacuum or pressure in the intake manifold.

Controller 12 receives signals from the various sensors of FIG. 1 and employs the various actuators of FIG. 1 to adjust engine operation based on the received signals and instructions stored on a memory of the controller. For example, based on the engine speed and load, the controller may adjust the compression ratio of the engine by sending a signal to the VCR actuator 192, which actuates the VCR mechanism 194 to mechanically move the piston closer to or further from the cylinder head, thereby changing a volume of the combustion chamber.

Non-transitory storage medium read-only memory 110 can be programmed with computer readable data representing instructions executable by microprocessor unit 106 for performing the methods described below as well as other variants that are anticipated but not specifically listed.

In this way, the components of FIG. 1 provides for a system comprising: an engine having a cylinder; a variable compression ratio mechanism for mechanically altering a piston position within the cylinder; a position sensor coupled to the variable compression ratio mechanism; a spark plug for providing spark to the cylinder; a fuel injector for directly injecting fuel into the cylinder; a knock sensor; and a controller configured with computer readable instructions stored on non-transitory memory for: actuating the variable compression ratio mechanism to provide a compression ratio selected based on engine operating conditions; and based on the selected compression ratio, operating in one of a first mode with a higher split ratio of intake stroke to compression stroke direct injected fuel and a second mode with a lower split ratio of intake stroke to compression stroke direct injected fuel. As an example, the first mode may be selected when the compression ratio is higher, and the second mode may be selected when the compression ratio is lower. The higher split ratio of intake stroke to compression stroke direct injected fuel may include delivering a larger portion of fuel during an intake stroke and a smaller portion of fuel during a compression stroke relative to the lower split ratio of intake stroke to compression stroke direct injected fuel. As another example, fuel may be direct injected later during an intake stroke and earlier during a compression stroke for the first operating mode relative to the second operating mode. As a further example, the number of intake stroke direct injections performed in the first mode may be higher than in the second mode. As still another example, the number of compression stroke direct injections performed in the first mode may be lower than in the second mode.

Figure 2:
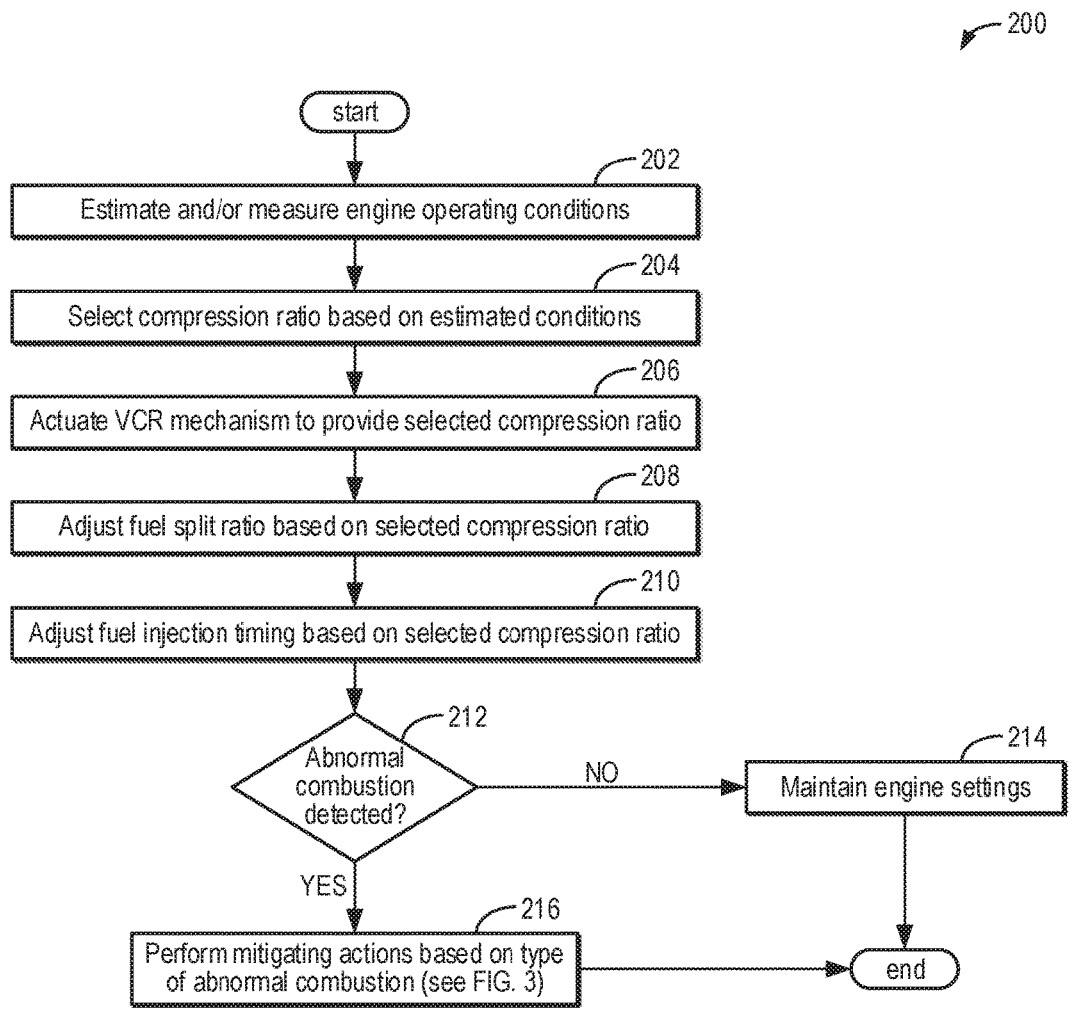
FIG. 2 shows an example method for adjusting a fuel direct injection split ratio and timing based on a selected compression ratio in a variable compression ratio engine.

Now turning to FIG. 2, an example method 200 for adjusting a compression ratio of a VCR engine (such as engine 10 of FIG. 1) based on engine operating conditions and adjusting fuel injection timing and split ratio based on the compression ratio is shown. For example, a ratio of fuel injected during an intake stroke relative to an amount of fuel injected during a compression stroke may be adjusted. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation according to the methods described below.

At 202, method 200 includes estimating and/or measuring engine operating conditions. Engine operating conditions may include, for example, driver power demand (for example, as based on an output of a pedal position sensor coupled to an operator pedal); ambient temperature, pressure, and humidity; engine temperature; manifold pressure (MAP); manifold air flow (MAF); catalyst temperature; intake temperature; boost level; fuel octane of fuel available in a fuel tank; etc.

At 204, method 200 includes selecting a compression ratio for operating the engine based on the estimated engine operating conditions. The engine may be configured with a VCR mechanism (e.g., VCR mechanism 194 of FIG. 1) that mechanically alters the engine compression ratio between a first, higher and a second, lower compression ratio setting. The VCR mechanism may achieve this by mechanically altering a position of a piston within a cylinder responsive to a command received from the engine controller. Thus, operating the engine at the first, higher compression ratio may include operating the engine in a first mode, and operating the engine at the second, lower compression ratio may include operating the engine in a second mode. Alternatively, multiple compression ratios between the first and second compression ratio may be possible. The controller may compare the fuel efficiency at each compression ratio of the engine at the given driver power demand and select the compression ratio that provides the highest fuel efficiency. The controller may compare the fuel efficiency at each compression ratio by comparing the brake specific fuel consumption (BSFC) of the engine at each compression ratio, for example. The fuel efficiency of the engine at each compression ratio may be determined via a table, a map, an algorithm, and/or an equation, each stored as a function of operating conditions (e.g., engine speed, torque, temperature, humidity, inferred fuel octane, etc.).

At 206, method 200 includes actuating the VCR mechanism to provide the selected compression ratio. For example, the controller may send a signal to a VCR actuator (e.g., VCR actuator 192 of FIG. 1) coupled to the VCR mechanism to actuate the mechanism to a position that provides the selected compression ratio. In one example, the controller may send a signal to actuate the VCR mechanism to a higher compression ratio setting at low-to-moderate engine speeds and loads. As another example, the controller may send a signal to actuate the VCR mechanism to a lower compression ratio setting at moderate-to-high engine speeds and loads.

At 208, method 200 includes adjusting the fuel split ratio based on the selected compression ratio. For example, during the compression stroke, it takes less fuel to get an AFR rich enough for combustion in the vicinity of a spark plug at a high compression ratio than at a low compression ratio due to a smaller volume at TDC for the high compression ratio. Therefore, the AFR in the vicinity of the spark plug may be controlled with less fuel at the high compression ratio. Additionally, fuel may evaporate better at the high compression ratio. As another example, injecting a smaller amount of fuel during the compression stroke at the high compression ratio may help avoid piston impingement and resulting smoke and soot formation. Therefore, at higher compression ratios, an amount of fuel injected during the compression stroke may be decreased relative to an amount of fuel injected during the intake stroke. The controller may refer a look-up table, a map, an algorithm, and/or an equation to output the fuel split ratio for a given compression ratio input, for example. Thus, when the engine is operated in the first mode, a higher split ratio of intake stroke to compression stroke direct injected fuel may be used, and when the engine is operated in the second mode, a lower split ratio of intake stroke to compression stroke direct injected fuel may be used. The controller may further take into account an alcohol content of the fuel in adjusting the fuel split ratio. For example, as the alcohol content of the fuel increases, the amount of fuel injected during the compression stroke may be further decreased due to the increased volatility of the alcohol.

In addition to updating the split ratio, a number of injections of the split injection may also be adjusted. For example, the overall number of injections may be increased as the compression ratio increases, especially where tumble is highest. This includes delivering increased intake stroke injection of the adjusted split ratio as multiple shorter intake stroke injections. Further, the decreased compression stroke injection of the adjusted split ratio may also be delivered as multiple shorter compression stroke injections. In one example, the number of intake stroke injections may be higher than the number of compression stroke injections after adjusting the split ratio. The multiple shorter intake and compression stroke injections are less likely to penetrate enough into the air-fuel mixture, thereby reducing impingement on the cylinder wall or piston top, reducing soot formation.

It will be appreciated that in still further examples, an engine controller may maintain the fuel split ratio while adjusting the number of intake and compression stroke injections based on the compression ratio selection. For example, as the compression ratio increases, the number of intake and compression stroke injections may be increased, each of the injections having a lower than threshold pulsewidth, while the split ratio is maintained.

Figure 4:
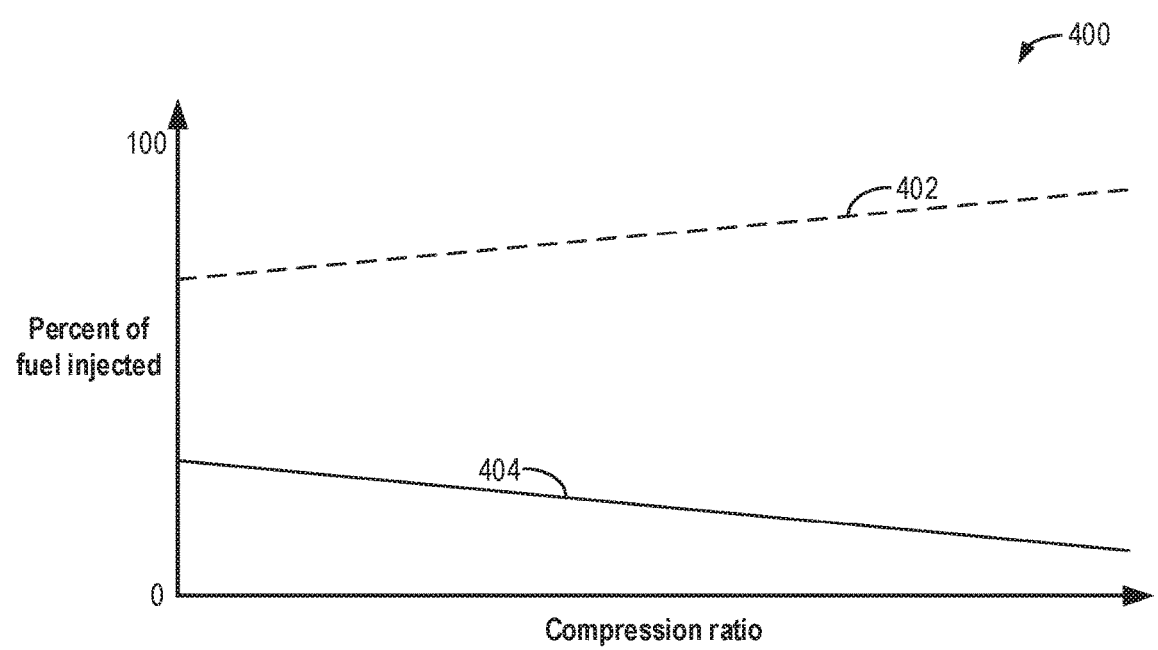
FIG. 4 is an example graph illustrating a relationship between a cylinder compression ratio and a proportion of fuel injected during an intake stroke and a compression stroke.

Turning briefly to FIG. 4, an example graph 400 illustrating the relationship between a compression ratio of an engine and a split ratio of fuel delivered via direct injection is shown. The X-axis represents the compression ratio, with values increasing from left to right, and the Y-axis represents a percent of fuel injected, with values increasing from bottom to top. Intake stroke fuel injection is shown in plot 402, and compression stroke fuel injection is shown in plot 404.

As the compression ratio increases, the split ratio of intake stroke injection to compression stroke injection increases. For example, at the lowest compression ratio, 70% of the total fuel amount is injected during the intake stroke (plot 402) and 30% during the compression stroke (plot 404). At the highest compression ratio, 90% of the total fuel amount is injected during the intake stroke (plot 402) and 10% during the compression stroke (plot 404). In the example of FIG. 4, plots 402 and 404 are linear. However, in other examples, plots 402 and 404 may be non-linear curves, such as exponential curves, with the general trend that intake stroke fuel injection (plot 402) increases as compression ratio increases and compression stroke fuel injection (plot 404) decreases as compression ratio increases, with the total fuel mass injected at a given compression ratio for an engine cycle (e.g., the sum of the percentage of fuel injected during the intake stroke and the percentage of fuel injected during the compression stroke) equal to 100%. Note that the split injection ratio does not define the amount of fuel injected, which may be calculated based on engine operating conditions in order to achieve a desired AFR. Additionally, an octane rating and alcohol content of the fuel may affect the shapes of plots 402 and 404.

Returning to FIG. 2, at 210, method 200 includes adjusting fuel injecting timing based on the selected compression ratio. For example, as the compression ratio increases, the intake stroke injection timing (e.g., a start of injection) may be retarded and the compression stroke injection timing may be advanced. The number of crank angle degrees by which the start of injection during each stroke is advanced or retarded may be related to the relative position of the piston in the cylinder, which may be defined by the position of the VCR mechanism. For example, the controller may refer a look-up table with the VCR mechanism position (or selected compression ratio) as the input and the intake stroke and compression stroke injection timings as the outputs. Further, injection timing may be affected by the type of VCR mechanism used (e.g., a mechanism that changes the piston position versus a mechanism that moves the cylinder head). For example, if the VCR mechanism includes a pressure reactive piston, the intake stroke and compression stroke injection timings may not be adjusted based on the compression ratio, as piston deflection occurs after both fuel injection and combustion have ended. As another example, a VCR mechanism that uses a tilting head may utilize alternative injection timing adjustments due to the targeting of the fuel injector changing as the head is tilted. By varying the fuel injection timing based on the compression ratio, fuel direct injection may begin at a specific piston position instead of a set crank angle.

Figure 5:
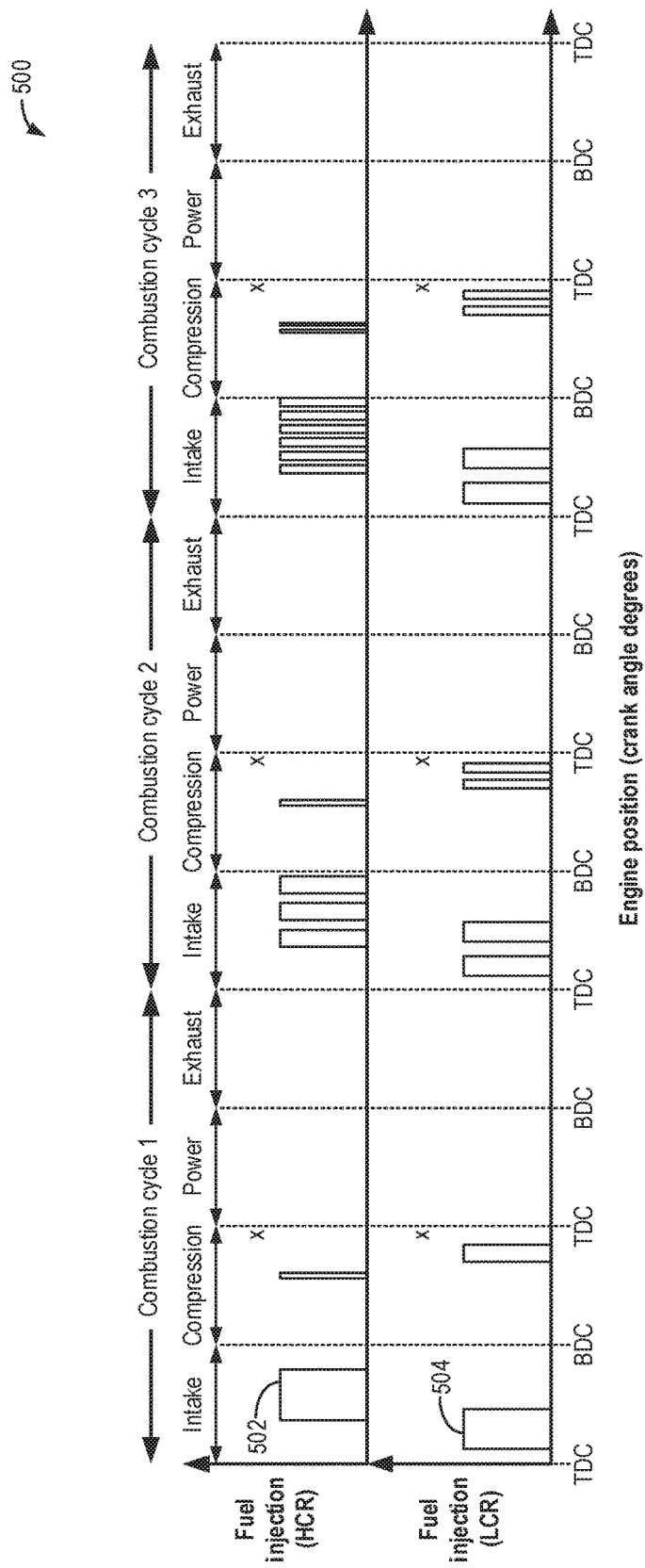
FIG. 5 is an example graph illustrating how fuel injection timing is adjusted relative to crank angle for a high compression ratio versus a low compression ratio engine.
Figure 6:
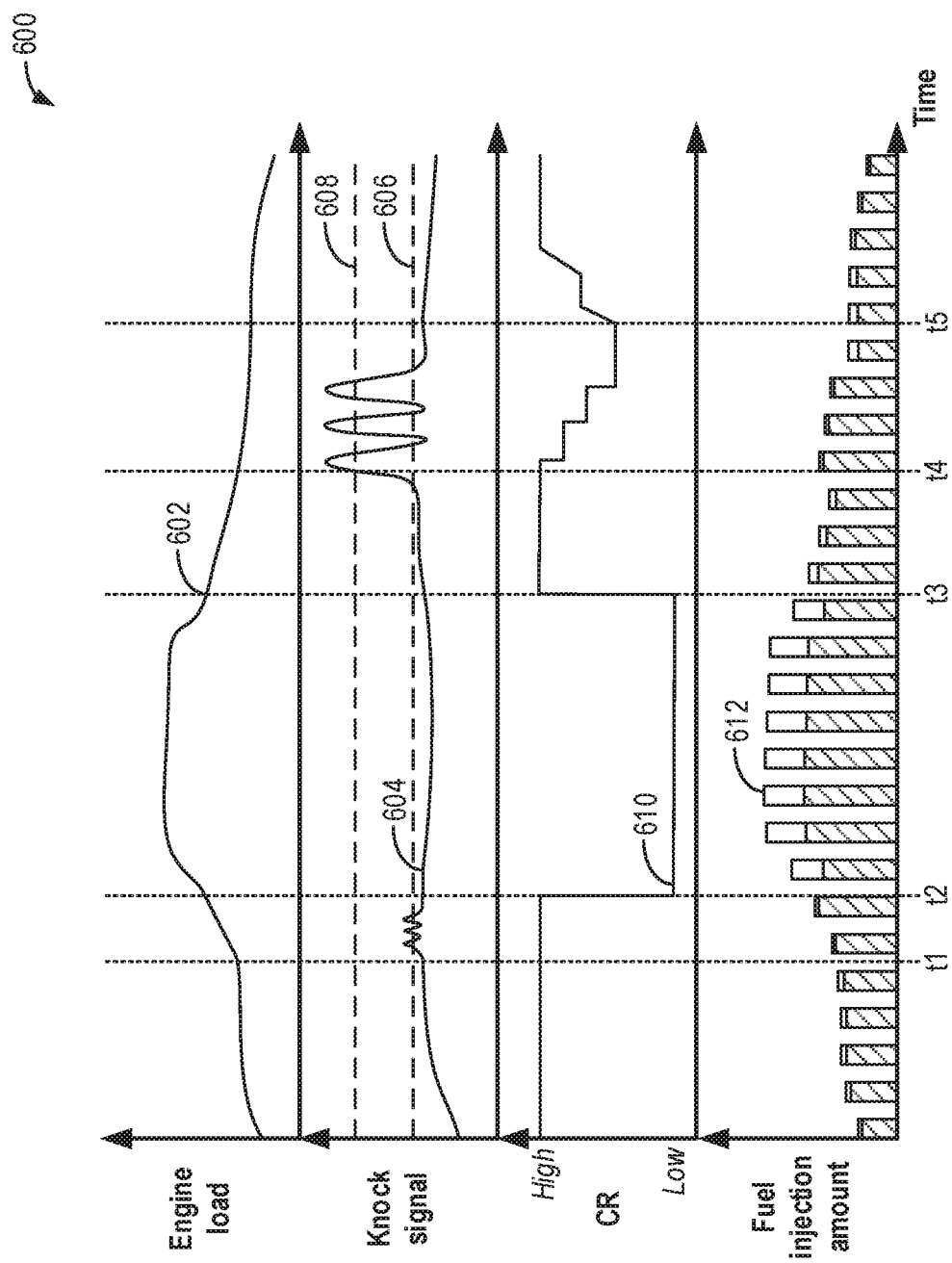
FIG. 6 depicts a prophetic example of compression ratio and fuel split ratio adjustments during engine operation.

Turning briefly to FIG. 5, an example graph 500 depicting how fuel direct injection timing and split ratio are varied based on engine compression ratio is shown. A fuel injection command for an engine operating in the first mode at a high compression ratio (HCR) is shown at 502, and a fuel injection command for an engine operating in the second mode at a low compression ratio (LCR) is shown at 504. The Y-axis for each plot represents the labeled parameter, with values increasing from bottom to top. The X-axis for all of the above represents engine position in crank angle degrees, with each stroke in each combustion cycle labeled. For a given crank angle, a piston position becomes higher as the engine compression ratio increases (e.g., the LCR engine has a reduced piston displacement compared with the HCR engine). Three combustion cycles are shown to illustrate three example fueling strategies, with an "X" marking a spark timing (e.g., before TDC of the compression stroke). For example, in combustion cycle 1, one fuel injection is performed during the intake stroke and one during the compression stroke for two total injections. In combustion cycle two, four total injections are divided among the intake stroke and compression stroke. In combustion cycle 3, the number of injections performed during each stroke is increased for the HCR engine compared with the LCR engine. Thus, for each combustion cycle, a first portion of a total fuel mass is delivered in the intake stroke and a second, remaining portion of the total fuel mass is delivered in the compression stroke, with the number of injections delivering the first and second portions varying.

During the intake stroke of combustion cycle 1, a greater mass of fuel is injected (e.g., a greater FPW is used) for the engine operating at the HCR (plot 502) than the engine operating at the LCR (plot 504) owing to a better fuel evaporation achieved at a higher compression ratio. Due to the reduced piston displacement of the LCR engine versus the HCR engine, the piston of the LCR engine may reach a specific cylinder height at fewer crank angle degrees than the HCR engine as it travels from TDC to BDC. Thus, the start of injection is earlier for the LCR engine (plot 504) than the HCR engine (plot 502) for the intake stroke.

During the compression stroke of combustion cycle 1, more fuel is injected for the LCR engine (plot 504) than the HCR engine (plot 502), such that the same total fuel mass is injected in each engine prior to spark ignition. Again due to the reduced piston displacement of the LCR engine compared with the HCR engine, it may take more crank angle degrees for the piston within the LCR engine to reach the same position in the cylinder as the piston within the HCR engine as it travels from BDC to TDC. Thus, the start of injection is earlier for the HCR engine (plot 502) than the LCR engine (plot 504) for the compression stroke.

During combustion cycle 2, the same overall amount of fuel is injected as in combustion cycle 1, the spit ratio remains the same, and the start of injection occurs at the same engine position as in combustion cycle 1 for both the HCR engine and the LCR engine. However, the fuel is delivered via multiple injections during each stroke. Performing a series of shorter duration injections may facilitate fuel vaporization, as less fuel is delivered per injection. Further, fuel penetration may be reduced by delivering the same amount of fuel through multiple, shorter duration bursts, which may in turn reduce fuel adherence to the piston. In the example of combustion cycle 2, the intake stroke injection is split into three shorter duration injections for the HRC engine (plot 502) and into two for the LCR engine (plot 504), and the compression stroke injection is split into two shorter duration injections for the LCR engine. As shown, the amount of fuel delivered per intake stroke injection or compression stroke injection may be uniform, with a predetermined duration elapsing between each injection. However, in other examples, the fuel amount per injection may be non-uniform and/or the duration between each injection may be distinct. It will be appreciated that in still further examples, the engine calibration may be updated based on the specific engine design and VCR configuration.

During combustion cycle 3, the same overall amount of fuel is injected as in combustion cycles 1 and 2, the split ratio remains the same, and the start of injection occurs at the same engine position as in combustion cycles 1 and 2 for both the HCR engine and the LCR engine. Like combustion cycle 2, the fuel is delivered via multiple injections during each stroke. However, during combustion cycle 3, the number of injections is adjusted based on the compression ratio, as described with respect to FIG. 2, instead of performing the same overall number of injections for both the HCR engine and the LCR engine (e.g., as in combustion cycles 1 and 2). While the fueling strategy for combustion cycle 3 remains the same as combustion cycle 2 for the LCR engine (plot 504), the number of injections performed during both the intake stroke and the compression stroke is increased for the HCR engine (plot 502). In the example of combustion cycle 3, eight short intake stroke injections and two short compression stroke injections are performed for the HCR engine, further reducing fuel impingement on the cylinder wall or piston top and reducing soot formation.

Returning to FIG. 2, at 212, it is determined if abnormal combustion is detected. For example, abnormal combustion may be detected based on outputs of a knock sensor (e.g. knock sensor 90 of FIG. 1) and a crankshaft acceleration sensor. As described with respect to FIG. 1, abnormal combustion may be differentiated as knock responsive to knock sensor output obtained in a knock window being higher than a knock threshold or pre-ignition responsive to knock sensor output obtained in a pre-ignition window being higher than a pre-ignition threshold (which is higher than the knock threshold). The knock window for a cylinder may include a crank angle window after a spark event in the cylinder, while the pre-ignition window for the cylinder may include a crank angle window before a spark event in the cylinder. The knock and pre-ignition windows may be non-overlapping or partially overlapping.

If abnormal combustion is not detected, method 200 proceeds to 214 and includes maintaining engine settings. For example, the compression ratio of the engine, fuel injection timings and amounts, and spark timing may continue to be nominally adjusted based on engine operating conditions, including changing operator torque demand, and compression ratio selection. Following 214, method 200 ends.

If abnormal combustion is detected, method 200 proceeds to 216 and includes performing mitigating actions based on the type of abnormal combustion, as will be described below with respect to FIG. 3. For example, different mitigating actions may be performed responsive to an indication of knock than responsive to an indication of pre-ignition. Following 216, method 200 ends.

In this way, FIG. 2 provides a method for adjusting a split ratio of fuel and direct injection timing based on a compression ratio of the engine. For example, an amount of fuel injected during an intake stroke relative to a compression stroke may be increased as the compression ratio of the engine increases, as also described with respect to FIGS. 4 and 5, due to an increased fuel evaporation at the higher compression ratio. Further, a start of injection during each stroke may be adjusted so that fuel is delivered at the same piston position within a cylinder, which may change relative to crankshaft position based on the compression ratio, as also described with respect to FIG. 5.

Figure 3:
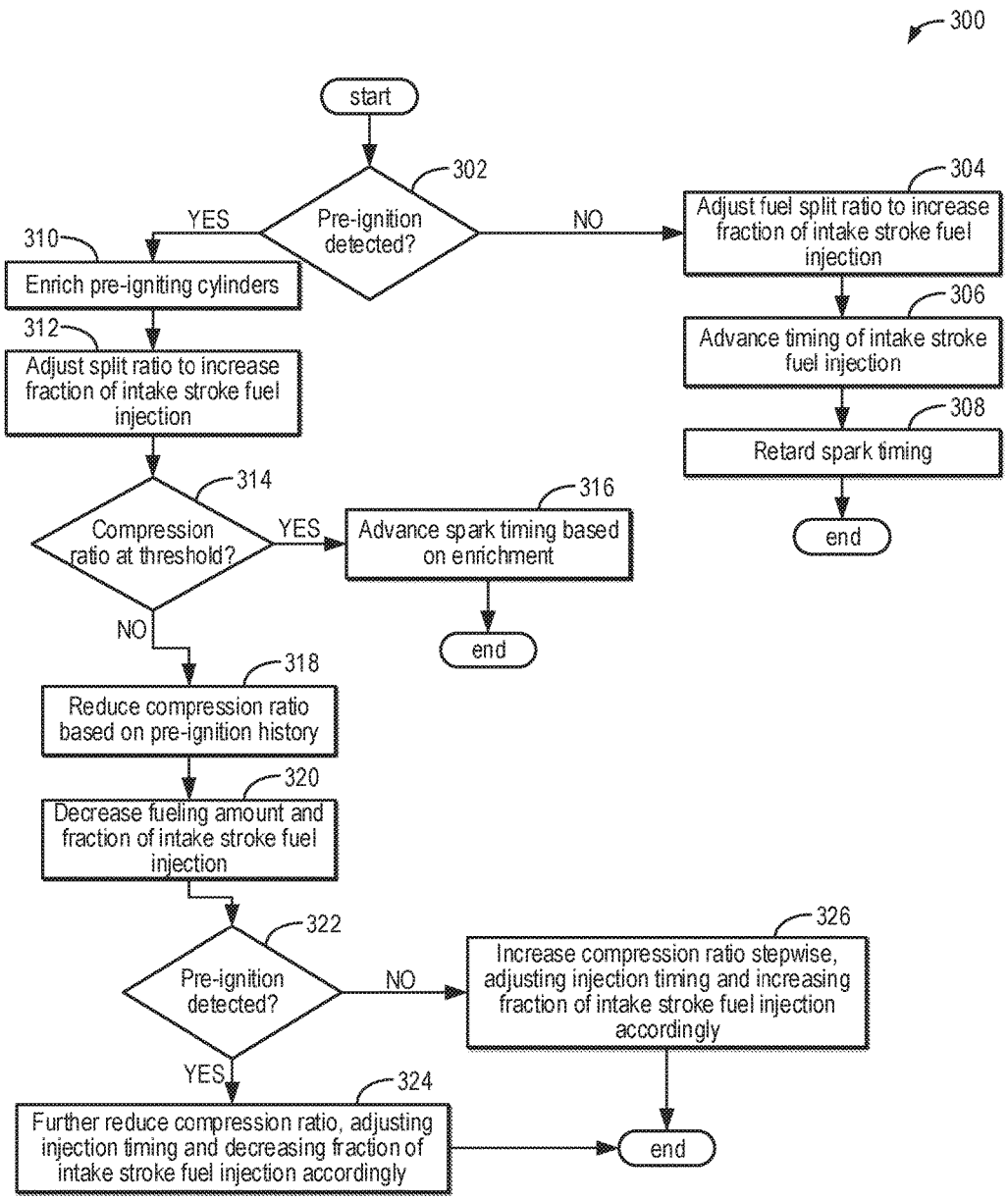
FIG. 3 shows an example method for further adjusting the fuel direct injection split ratio and timing responsive to an indication of abnormal combustion in the variable compression ratio engine.

Turning to FIG. 3, an example method 300 is provided for performing mitigating actions responsive to an indication of abnormal combustion in a VCR engine, which may reduce the propensity for subsequent abnormal combustion events. For example, method 300 may be performed as part of method 200 of FIG. 2 (e.g., at 216).

Method 300 begins at 302 and includes determining if pre-ignition is detected. As described with respect to FIG. 1, pre-ignition may be detected responsive to output of a knock sensor (e.g., knock sensor 90 of FIG. 1) obtained during a pre-ignition crank angle timing window being higher than a pre-ignition threshold.

If pre-ignition is not detected, it may be assumed that knock is detected, as method 300 is performed responsive to an indication of abnormal combustion. Thus, if pre-ignition is not detected at 302, method 300 proceeds to 304 and includes adjusting a fuel split ratio to increase a fraction of intake stroke fuel injection. That is, responsive to an indication of knock, the split ratio of fuel injected during an intake stroke and a compression stroke may be adjusted so that a greater amount of fuel is injected during the intake stroke than nominal for a given compression ratio (as determined at 208 of FIG. 2, for example). The increased amount of intake stroke injection serves to increase cylinder charge cooling, thereby reducing the occurrence of further knock. In one example, if the nominal split ratio for the given compression ratio is 90% intake injection and 10% compression injection, the split ratio may be adjusted to 95% intake injection and 5% compression injection. The degree to which the fraction of intake injection increases may be determined based on the intensity and/or number of knock events, with the fraction of intake injection further increasing as the intensity and/or number of knock events increases.

At 306, method 300 includes advancing a timing of the intake stroke fuel injection. With more fuel delivered during the intake stroke than nominal for the given compression ratio, the start of injection may be advanced so that the injection finishes by a pre-determined timing, for example.

At 308, method 300 includes retarding spark timing. For example, spark timing may be retarded from a nominal timing that is set based on the compression ratio and engine operating conditions. The nominal timing may be selected by a controller (e.g., controller 12 of FIG. 1) by referring a map, algorithm, or look-up table with the compression ratio (or VCR mechanism position), engine speed, intake air temperature, MAP, MAF, and air-fuel ratio as the inputs and the spark timing as the output. Then, the controller may retard this timing responsive to an indication of knock (e.g., as determined at 302), for example. The degree to which spark timing is retarded may be determined based on the intensity and/or number of knock events, with the amount of spark retard from the nominal setting increasing as the intensity and/or number of knock events increases until a spark retard usage limit is reached. Additionally, a larger amount of spark retard usage (and thus a larger spark retard limit) may be tolerated when operating in a higher compression ratio, while a smaller amount of spark retard usage (and thus a smaller spark retard limit) may be tolerated when operating in a lower compression ratio. The limit may define a spark retard amount beyond which engine power losses, overheating tendencies, and high emissions may occur at the commanded compression ratio, and thus, spark may not be further retarded from the limit.

Further, the amount of spark retard used may be adjusted based on the determined fuel split ratio. For example, by increasing the amount of fuel delivered in the intake stroke, the amount of spark retard required for knock mitigation may be reduced. Following 308, method 300 ends.

Returning to 302, if pre-ignition is detected, method 300 proceeds to 310 and includes enriching pre-igniting cylinders. Increasing an amount of fuel delivered to the pre-igniting cylinders relative to an amount of air (e.g., operating the cylinders at a richer AFR than stoichiometry) results in a charge cooling effect that decreases a temperature within the pre-igniting cylinders. By cooling the pre-igniting cylinders, a further occurrence of pre-ignition is mitigated. As fuel enrichment may degrade fuel economy, degrade exhaust emissions, and lead to a possible torque reduction, the pre-igniting cylinder(s) may be selectively enriched instead of enriching every cylinder of the engine. Further, fuel enrichment may be performed for a number of engine cycles, after which fueling may be returned to a nominal amount, as described further below.

At 312, method 300 includes adjusting the split ratio to increase the fraction of intake stroke fuel injection. That is, a proportion of fuel delivered during the intake stroke is increased and a proportion of fuel delivered during the compression stroke is decreased than nominal for the compression ratio setting of the engine, as described at 304.

At 314, it is determined if the compression ratio is at a threshold ratio. For example, the threshold ratio may refer to a minimum compression ratio that may be applied, below which engine performance may be degraded. Further, the threshold ratio may be a hard limit that is defined by the VCR mechanism, for example, due to the specific configuration of the piston on an eccentric shaft.

If the compression ratio is at the threshold, method 300 proceeds to 316 and includes advancing spark timing based on the enrichment. For example, spark timing may be advanced from maximum brake torque (MBT) based on the enrichment and further based on borderline (BDL) spark limits at the current operating conditions. Specifically, it may be determined that significant charge cooling benefits may be achieved through the enrichment, and spark may be advanced (e.g., operated closer to MBT) to recover some of the torque lost due to cylinder operation at richer than rich for best torque (RBT). Following 316, method 300 ends.

If the compression ratio is not at the threshold at 314, method 300 proceeds to 318 and includes reducing the compression ratio based on a pre-ignition history. For example, an engine pre-ignition count may be retrieved. The engine pre-ignition count may include an overall pre-ignition count for the engine. In addition, pre-ignition counts for individual cylinders may also be retrieved. As such, the pre-ignition count of the engine (or cylinder) may reflect its propensity for pre-ignition. Thus, as the pre-ignition count increases, the likelihood of pre-ignition occurrence in the engine (or given cylinder) may be higher. Using the pre-ignition count, the compression ratio may be reduced (or clipped) to a feedback level. Specifically, the compression ratio may be reduced from a nominal level for a given engine speed and load to the feedback level (lower than the nominal level), with the degree of reduction based on the pre-ignition history. Thus, as the pre-ignition count of the engine increases (and the propensity for the engine to pre-ignite increases), the feedback compression ratio level may be lowered further from the nominal compression ratio level. The reduction may be gradual or, alternatively, as the pre-ignition count increases by a threshold amount, the compression ratio may be reduced (stepwise) by a predefined amount.

In addition to determining the feedback compression ratio level, a piston displacement corresponding to the feedback compression ratio level may also be determined. In one example, the piston displacement corresponding to the feedback compression ratio may include a less than maximum piston displacement, wherein the piston moves close to (but not all the way to) the cylinder head in the combustion chamber. In other words, an amount of space may be increased between the cylinder head and a final position (e.g., TDC) of the piston as the feedback compression ratio level decreases.

At 320, method 300 includes decreasing the fueling amount and fraction of intake stroke fuel injection. With the compression ratio decreased, the likelihood of pre-ignition is also decreased. Thus, fuel enrichment is no longer needed to mitigate pre-ignition, and a nominal amount of fuel for engine operating conditions, such as to achieve a stoichiometric AFR, may be provided. Further, the split ratio of fuel may be adjusted for the reduced compression ratio, with the fraction of intake injection decreased (and the fraction of compression injection increased) accordingly. For example, the split ratio may be determined based on the feedback compression ratio, as described with respect to FIG. 2 (e.g., at 208). Further, injection timing may be adjusted based on the feedback compression ratio (e.g., as at 210 of FIG. 2).

At 322, method 300 includes determining if pre-ignition is continued to be detected even after the pre-ignition mitigating enrichment is performed. If pre-ignition is detected, such as occurs when there is persistent pre-ignition, method 300 proceeds to 324 and includes further reducing the compression ratio, adjusting the injection timing and decreasing the fraction of intake stroke fuel injection accordingly. For example, due to the displacement of the piston decreasing as the compression ratio decreases, the intake stroke injection timing may be advanced and the compression stroke injection may be retarded compared with the previous, higher compression ratio setting. Further, the amount of fuel injected during the compression stroke relative to the intake stroke may be increased due to decreased fuel evaporation at the lower compression ratio. In one example, the compression ratio may be decreased stepwise, with the fuel injection timing and split ratio adjusted accordingly for each reduced compression ratio, until pre-ignition is no longer detected. Following 324, method 300 ends.

If pre-ignition is not detected at 322, method 300 proceeds to 326 and includes increasing the compression ratio stepwise, adjusting injection timing and increasing the fraction of intake stroke fuel injection accordingly. For example, due to the displacement of the piston increasing as the compression ratio increases, the intake stroke injection timing may be retarded and the compression stroke injection may be advanced compared with the previous, lower compression ratio setting. Further, the amount of fuel injected during the intake stroke relative to the compression stroke may be increased due to increased fuel evaporation at the higher compression ratio. Following 326, method 300 ends.

In this way, FIG. 3 provides a method for performing mitigating actions, including further adjusting fuel direct injection timing and split ratio, in a VCR engine responsive to an indication of abnormal combustion, such as knock and pre-ignition, in order to reduce an additional occurrence of abnormal combustion. Reducing the occurrence of knock and pre-ignition may help extend the life of engine components.

Turning now to FIG. 6, an example graph 600 of compression ratio and fuel split ratio adjustments during engine operation is shown. Engine load is depicted in plot 602, knock signal is shown in plot 604, compression ratio (CR) is shown in plot 610, and fuel injection amount is depicted in plot 612. Further, the knock signal is shown relative to a knock threshold, indicated by dashed line 606, and a pre-ignition threshold, indicated by dashed line 608. Additionally, the fuel injection amount is divided into an amount delivered through via stroke direct injection (diagonally shaded area) and an amount delivered via compression stroke injection (unshaded area). For all of the above, the X-axis represents time, with time increasing from left to right. The Y-axis of each plot represents the labeled parameter, with values increasing from bottom to top.

Prior to t1, responsive to a lower operator torque demand and a correspondingly low engine load (plot 602), the engine is operated at a high compression ratio, as shown in plot 610. For example, the engine may be operated in a first mode, with a position of a VCR mechanism (e.g., VCR mechanism 194 of FIG. 1) actuated to a first position that corresponds to the high compression ratio. The total amount of fuel injected (plot 612) for an engine cycle corresponds to the engine load (plot 602), with the amount of fuel increasing as the engine load increases. As shown in plot 612, at the high compression ratio, a small portion (e.g., 10%) of the fuel is injected during the compression stroke (unshaded area), with the rest (e.g., 90%) delivered during the intake stroke (diagonally shaded area). Due to the engine operating with a relatively low engine load, knock does not occur, as shown by the knock signal (e.g., the output of a knock sensor, such as knock sensor 90 of FIG. 1) remaining below the knock threshold (dashed line 606).

Between t1 and t2, the engine load (plot 602) increases responsive to operator demand, and the amount of fuel injected (plot 612) increases accordingly. The engine remains at the high compression ratio (plot 610). With the higher engine load at the high compression ratio, knock occurs, as shown by the knock signal (plot 604) surpassing the knock threshold (dashed line 606). Responsive to the occurrence of knock, the fuel split ratio is adjusted to increase the fraction of fuel injected during the intake stroke and decrease the fraction of fuel injected during the compression stroke, as shown by the smaller proportion of compression stroke injection (unshaded area) of plot 612 between t1 and t2 compared with prior to t1. Further, the start of the intake stroke injection may be advanced (not shown), and spark timing may be retarded (not shown).

Beginning at t2, the engine load (plot 602) continues to increase responsive to a further increase in operator pedal position. If the engine were maintained in the high compression ratio, the knock propensity of the engine would increase, resulting in a further need for spark retard. The spark retard fuel penalty would offset the fuel efficiency of the higher compression ratio. The engine is therefore transitioned to a second mode of operation.

Between t2 and t3, the engine is operated in the second mode, with the VCR mechanism actuated to a position corresponding to a low compression ratio (plot 610). The amount of fuel injected (plot 612) increases responsive to engine load, and the split ratio is adjusted. At the low compression ratio, a higher proportion (e.g., 30%) of the fuel is injected during the compression stroke (unshaded area) than when the engine were operating at the high compression ratio (e.g., such as prior to t1). Additionally, at the low compression ratio, the propensity for knock is decreased, and the knock signal (plot 604) remains below the knock threshold (dashed line 606). Further, compared with operating at the high compression ratio, the start of the intake stroke injection is advanced and the start of the compression stroke injection is retarded, as shown with respect to FIG. 5.

At t3, responsive to a decrease in engine load (plot 602), for example, due to an operator pedal tip-out, the engine is transitioned back to the first operating mode, wherein the engine is operated at the high compression ratio (plot 610). Accordingly, the VCR mechanism is actuated to the position corresponding to the high compression ratio. The fuel split ratio is adjusted so that the proportion of fuel injected during the intake stroke is increased and the proportion of fuel injected during the compression stroke is decreased compared with operation at the low compression ratio, as shown by a decrease in the proportion of the unshaded area of the bars of plot 612 between t3 and t4. Further, compared with operating at the low compression ratio, the state of the intake stroke injection is again advanced and the start of the compression stroke injection is retarded in order to maintain injection timing relative to piston position, as described further with respect to FIGS. 2 and 5.

At t4, pre-ignition occurs, as shown by the knock signal (plot 604) surpassing the pre-ignition threshold (dashed line 608). For example, pre-ignition may occur due to increased in-cylinder temperatures and pressures, which may be exacerbated by the high compression ratio. Responsive to the indication of pre-ignition, the pre-igniting cylinders are enriched, with the split ratio adjusted to further increase the fraction of fuel delivered during the intake stroke (plot 612). For example, the fraction of fuel delivered during the intake stroke may be increased from 90% to 95%. Following the first enrichment event, the compression ratio (plot 610) is lowered stepwise until pre-ignition no longer occurs or the compression ratio reaches a threshold ratio, as described with respect to FIG. 3. When pre-ignition no longer occurs (e.g., prior to t5), the fuel amount (plot 612) is lowered to a nominal amount, such as for a stoichiometric AFR. Further, the fraction of fuel injected during the intake stroke is decreased, and the injection timing may be optimized for the actual (e.g., measured) compression ratio.

Responsive to no further indication of pre-ignition (e.g., pre-ignition is not detected for a threshold duration), the compression ratio may be gradually raised in order to provide a nominal compression ratio for the given engine operating conditions (such as speed and load). Thus, after t5, the compression ratio (plot 610) is gradually raised to an intermediate compression ratio by actuating the VCR mechanism. Following no further indication of pre-ignition, the compression ratio is further raised until the nominal compression ratio (e.g., the high compression ratio) is reached. As the compression ratio is raised, the fraction of compression stroke injection is decreased, as shown by the decreasing proportion of the unshaded area of the bars of plot 612. Thus, fuel injection timing and split ratio may be returned to nominal values for the given compression ratio, such as depicted in the examples of FIGS. 4 and 5.

In this way, fuel direct injection timing and split ratio may be optimized based on a compression ratio of a VCR engine. Since a piston displacement differs based on compression ratio, adjusting a start of injection relative to crankshaft position ensures that fuel is injected when the piston is an appropriate distance from the cylinder head, thereby reducing an amount of fuel that adheres to the piston crown and, in turn, reducing emissions. Further, the fuel has different evaporative properties at different compression ratios, with higher compression ratios increasing fuel evaporation. Thereby, less fuel may be injected during a compression stroke at a higher compression ratio than at a lower compression ratio. By optimizing the split ratio of direct injected fuel based on the compression ratio, good combustion stability may be maintained. Additionally, in the event of knock or pre-ignition, fuel injection timing and split ratio may be further adjusted, extending engine component life by reducing a further occurrence of abnormal combustion.

As one example, a method for an engine comprises: actuating a variable compression ratio mechanism of a cylinder to provide a compression ratio selected based on engine operating conditions; and adjusting an amount of fuel direct injected into the cylinder in an intake stroke relative to a compression stroke based on the selected compression ratio. In the preceding example, additionally or optionally, actuating the variable compression ratio mechanism mechanically alters a piston displacement within the cylinder. In any or all of the preceding examples, additionally or optionally, adjusting the split ratio of fuel direct injected into the cylinder in the intake stroke relative to the compression stroke based on the selected compression ratio includes increasing an amount of fuel injected during the intake stroke relative to an amount of fuel injected during the compression stroke as the selected compression ratio increases. In any or all of the preceding examples, additionally or optionally, adjusting the split ratio of fuel direct injected into the cylinder in the intake stroke relative to the compression stroke based on the selected compression ratio includes adjusting a number of intake stroke fuel injections relative to compression stroke fuel injections. In any or all of the preceding examples, additionally or optionally, adjusting the number of intake stroke fuel injections relative to compression stroke fuel injections includes increasing the number of intake stroke injections while decreasing the number of compression stroke injections as the selected compression ratio increases. In any or all of the preceding examples, the method additionally or optionally comprises adjusting a timing of fuel direct injection into the cylinder based on the selected compression ratio. In any or all of the preceding examples, additionally or optionally, adjusting the timing of fuel direct injection into the cylinder based on the selected compression ratio includes retarding a start of injection of an intake stroke direct injection and advancing the start of injection of a compression stroke direct injection as the selected compression ratio increases. In any or all of the preceding examples, the method additionally or optionally comprises, responsive to an indication of knock, increasing the split ratio of fuel direct injected into the cylinder in the intake stroke relative to the compression stroke from that determined based on the selected compression ratio, advancing the timing of the intake stroke direct injection from that determined based on the selected compression ratio, and retarding a spark timing. In any or all of the preceding examples, the method additionally or optionally comprises, responsive to an indication of pre-ignition, reducing the compression ratio to a feedback level, adjusting the split ratio of fuel direct injected into the cylinder in the intake stroke relative to the compression stroke based on the feedback compression ratio, and adjusting the timing of fuel direct injection into the cylinder based on the feedback compression ratio.

As another example, a method for an engine comprises: as a compression ratio applied to engine cylinders increases, increasing a split ratio of fuel delivered to the cylinders via an intake stroke direct injection relative to a compression stroke direct injection, while retarding the intake stroke direct injection and advancing the compression stroke direct injection. In the preceding example, the method additionally or optionally comprises, responsive to an indication of pre-ignition, enriching the engine for a number of engine cycles while maintaining the compression ratio, and thereafter, reducing the compression ratio until a threshold compression ratio is reached while operating the engine at stoichiometry; and responsive to an indication of knock, further increasing the split ratio of fuel delivered via the intake stroke direct injection relative to the compression stroke direct injection, further advancing the intake stroke direct injection, and retarding spark timing. In any or all of the preceding examples, additionally or optionally, enriching the engine includes, for the number of engine cycles, increasing the split ratio of fuel delivered via the intake stroke direct injection relative to the compression stroke direct injection. In any or all of the preceding examples, additionally or optionally, reducing the compression ratio includes mechanically reducing a piston displacement within corresponding cylinders by actuating a variable compression ratio mechanism. In any or all of the preceding examples, the method additionally or optionally comprises, responsive to no further indication of pre-ignition received after the enriching and the decreasing the compression ratio, increasing the compression ratio over a duration by increasing the piston displacement within the combustion chamber over the duration.

As another example, a system comprises: an engine having a cylinder; a variable compression ratio mechanism for mechanically altering a piston position within the cylinder; a position sensor coupled to the variable compression ratio mechanism; a spark plug for providing spark to the cylinder; a fuel injector for directly injecting fuel into the cylinder; a knock sensor; and a controller configured with computer readable instructions stored on non-transitory memory for: actuating the variable compression ratio mechanism to provide a compression ratio selected based on engine operating conditions; and, based on the selected compression ratio, operating in one of a first mode with a higher split ratio of intake stroke to compression stroke direct injected fuel and a second mode with a lower split ratio of intake stroke to compression stroke direct injected fuel. In the preceding example, additionally or optionally, the first mode is selected when the compression ratio is higher, and the second mode is selected when the compression ratio is lower. In any or all of the preceding examples, additionally or optionally, the higher split ratio of intake stroke to compression stroke direct injected fuel includes delivering a larger portion of fuel during an intake stroke and a smaller portion of fuel during a compression stroke relative to the lower split ratio of intake stroke to compression stroke direct injected fuel. In any or all of the preceding examples, additionally or optionally, fuel is direct injected later during an intake stroke and earlier during a compression stroke for the first operating mode relative to the second operating mode. In any or all of the preceding examples, additionally or optionally, the number of intake stroke direct injections performed in the first mode is higher than in the second mode. In any or all of the preceding examples, additionally or optionally, the number of compression stroke direct injections performed in the first mode is lower than in the second mode.

In a further representation, a method for an engine comprises: actuating a variable compression ratio mechanism of a cylinder to provide a compression ratio selected based on engine operating conditions, delivering an amount of fuel into the cylinder as a split injection having a split ratio of fuel delivered in an intake stroke relative to a compression stroke, the split ratio based on the engine operating conditions, and adjusting a number of injections over which the fuel is delivered in each of the intake stroke and the compression stroke based on the selected compression ratio. In the preceding example, the adjusting includes delivering the fuel in the intake stroke as multiple fuel injections and delivering the fuel in the compression stroke as multiple fuel injections while maintaining the split ratio. In any or all of the preceding examples, each injection of the multiple fuel injections in the intake stroke and the compression stroke has a lower than threshold pulse-width. In any or all of the preceding examples, a number of the multiple fuel injections in the intake stroke is higher than the number of the multiple fuel injections in the compression stroke. In any or all of the preceding examples, the method further comprises, adjusting the split ratio based on the selected compression ratio, the amount of fuel delivered in the intake stroke increased as the selected compression ratio increases, the amount of fuel delivered in the compression stroke decreased as the selected compression ratio increases to maintain a total fuel mass delivered to the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
actuating a variable compression ratio mechanism of a cylinder to provide a compression ratio selected based on engine operating conditions;
adjusting a split ratio of fuel direct injected into the cylinder in an intake stroke relative to a compression stroke based on the selected compression ratio; and
adjusting a timing of a start of injection of an intake stroke direct fuel injection in the intake stroke based on the selected compression ratio.

2. The method of claim 1, wherein actuating the variable compression ratio mechanism mechanically alters a piston displacement within the cylinder.

3. The method of claim 1, wherein adjusting the split ratio of fuel direct injected into the cylinder in the intake stroke relative to the compression stroke based on the selected compression ratio includes increasing an amount of fuel injected during the intake stroke, as the intake stroke direct fuel injection, relative to an amount of fuel injected during the compression stroke as the selected compression ratio increases.

4. The method of claim 1, wherein adjusting the split ratio of fuel direct injected into the cylinder in the intake stroke relative to the compression stroke based on the selected compression ratio includes adjusting a number of intake stroke direct fuel injections relative to compression stroke direct fuel injections.

5. The method of claim 4, wherein adjusting the number of intake stroke direct fuel injections relative to compression stroke direct fuel injections includes increasing the number of intake stroke direct injections while decreasing the number of compression stroke direct injections as the selected compression ratio increases.

6. The method of claim 1, further comprising adjusting a timing of a start of injection of a compression stroke direct fuel injection in the compression stroke based on the selected compression ratio.

7. The method of claim 6, wherein adjusting the timing of a start of injection of the intake stroke direct fuel injection based on the selected compression ratio includes retarding the start of injection of the intake stroke direct fuel injection, and wherein adjusting the timing of the start of injection of the compression stroke direct fuel injection based on the selected compression ratio includes advancing the start of injection of the compression stroke direct fuel injection as the selected compression ratio increases.

8. The method of claim 1, further comprising, responsive to an indication of knock, increasing the split ratio of fuel direct injected into the cylinder in the intake stroke relative to the compression stroke from that determined based on the selected compression ratio, advancing the timing of the start of injection of the intake stroke direct fuel injection from that determined based on the selected compression ratio, and retarding a spark timing.

9. The method of claim 1, further comprising, responsive to an indication of pre-ignition, reducing the compression ratio to a feedback compression ratio, adjusting the split ratio of fuel direct injected into the cylinder in the intake stroke relative to the compression stroke based on the feedback compression ratio, and adjusting the timing of a start of injection of the intake stroke direct fuel injection based on the feedback compression ratio.

10. A method for an engine, comprising:
as a compression ratio applied to engine cylinders increases, increasing a split ratio of fuel delivered to the cylinders via an intake stroke direct injection relative to a compression stroke direct injection, while retarding the intake stroke direct injection and advancing the compression stroke direct injection.

11. The method of claim 10, further comprising:
responsive to an indication of pre-ignition, enriching the engine for a number of engine cycles while maintaining the compression ratio, and thereafter, reducing the compression ratio until a threshold compression ratio is reached while operating the engine at stoichiometry; and
responsive to an indication of knock, further increasing the split ratio of fuel delivered via the intake stroke direct injection relative to the compression stroke direct injection, further advancing the intake stroke direct injection, and retarding spark timing.

12. The method of claim 11, wherein enriching the engine includes, for the number of engine cycles, increasing the split ratio of fuel delivered via the intake stroke direct injection relative to the compression stroke direct injection, and wherein retarding the intake stroke direct injection and advancing the compression stroke direct injection as the compression ratio applied to the engine cylinders increases includes adjusting a timing of each of the intake stroke direct injection and the compression stroke direct injection based on the compression ratio applied to the engine cylinders.

13. The method of claim 11, wherein reducing the compression ratio includes mechanically reducing a piston displacement within corresponding cylinders by actuating a variable compression ratio mechanism, and wherein retarding the intake stroke direct injection and advancing the compression stroke direct injection is responsive to the increasing compression ratio.

14. The method of claim 13, further comprising, responsive to no further indication of pre-ignition received after the enriching and the decreasing the compression ratio, increasing the compression ratio over a duration by increasing the piston displacement within the combustion chamber over the duration.

15. A system, comprising:
an engine having a cylinder;
a variable compression ratio mechanism for mechanically altering a piston position within the cylinder;
a fuel injector for directly injecting fuel into the cylinder; and
a controller configured with computer readable instructions stored on non-transitory memory that, when executed, cause the controller to:
actuate the variable compression ratio mechanism to provide a compression ratio selected based on engine operating conditions; and
based on the selected compression ratio, operate in one of a first mode by injecting, via the fuel injector, a higher split ratio of intake stroke to compression stroke direct injected fuel when the selected compression ratio is higher and a second mode by injecting, via the fuel injector, a lower split ratio of intake stroke to compression stroke direct injected fuel when the selected compression ratio is lower.

16. The system of claim 15, further comprising a knock sensor for providing an indication of abnormal combustion and a spark plug for providing spark to the cylinder, and wherein the controller stores further instructions on non-transitory memory that, when executed, cause the controller to:
measure a knock signal from an output of the knock sensor; and
in response to the knock signal surpassing a knock threshold while operating in the first mode,
actuate the variable compression ratio mechanism to decrease the compression ratio from the selected compression ratio,
increase the higher split ratio of intake stroke to compression stroke direct injected fuel delivered via the fuel injector; and
retard a timing of the spark provided by the spark plug.

17. The system of claim 15, wherein the higher split ratio of intake stroke to compression stroke direct injected fuel includes delivering, via the fuel injector, a larger portion of fuel during an intake stroke relative to the lower split ratio of intake stroke to compression stroke direct injected fuel and a smaller portion of fuel during a compression stroke relative to the lower split ratio of intake stroke to compression stroke direct injected fuel.

18. The system of claim 15, wherein fuel is direct injected later during an intake stroke and earlier during a compression stroke for the first mode relative to the second mode.

19. The system of claim 15, wherein a number of intake stroke direct injections performed in the first mode is higher than in the second mode.

20. The system of claim 15, wherein a number of compression stroke direct injections performed in the first mode is lower than in the second mode.

* * * * *